(12) United States Patent
Zalmanovitch et al.

(10) Patent No.: US 9,369,589 B2
(45) Date of Patent: Jun. 14, 2016

(54) UPDATING DYNAMIC DATA USAGE PLANS AND STATISTICS

(71) Applicant: Microsoft Corporation, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/721,069

(22) Filed: Dec. 20, 2012

(65) Prior Publication Data

US 2013/0196622 A1     Aug. 1, 2013

Related U.S. Application Data

(60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.
*H04M 15/00*     (2006.01)
*H04W 4/26*     (2009.01)
(Continued)

(52) U.S. Cl.
CPC ........... *H04M 15/58* (2013.01); *H04L 12/1435* (2013.01); *H04L 43/04* (2013.01);
(Continued)

(58) Field of Classification Search
CPC ........... H04W 4/00; H04W 4/26; H04W 4/24; H04W 8/18; H04W 24/02; H04L 43/04; H04L 43/0876; H04L 12/1403; H04L 41/5029; H04L 41/5067; H04M 15/58; H04M 15/83; H04M 15/84; H04M 15/85
USPC .................................. 455/405–409; 709/224
See application file for complete search history.

(56) References Cited

U.S. PATENT DOCUMENTS 6,308,328 B1    10/2001    Bowcutt et al.
7,184,749 B2    2/2007    Marsh et al.
(Continued)

FOREIGN PATENT DOCUMENTS

WO    2008/097105 A1    8/2008
WO    2008/155444 A1    12/2008
(Continued)

OTHER PUBLICATIONS

Blass, Evan, "Exclusive: Windows Phone 8 Detailed", Retrieved at <<http://pocketnow.com/windows-phone/exclusive-windows-phone-8-detailed>>, Feb. 2, 2012, pp. 2.
(Continued)

*Primary Examiner* — Magdi Elhag
(74) *Attorney, Agent, or Firm* — John Jardine; Kate Drakos; Micky Minhas

(57) ABSTRACT

Embodiments enable data usage plans and data usage statistics to be shared among user computing devices. In some embodiments, a web service receives a schema populated with data describing the data usage plan from a mobile operator. The web service distributes the populated schema to the user computing devices, and subsequently distributes updated portions of the schema as the data usage plan is updated by the mobile operator. The web service may also collect the data usage statistics from the user computing devices and the mobile operator, reconcile any differences, and send synchronization notifications to the user computing devices based on the reconciliation. In some embodiments, users are able to view bandwidth consumption by a plurality of user computing devices sharing the same data usage plan.

20 Claims, 8 Drawing Sheets

(51) Int. Cl.
*H04W 24/02* (2009.01)
*H04L 12/26* (2006.01)
*H04L 12/14* (2006.01)
*H04W 4/24* (2009.01)
*H04W 8/18* (2009.01)
*H04M 1/725* (2006.01)

(52) U.S. Cl.
CPC ........... *H04L43/0876* (2013.01); *H04M 15/41* (2013.01); *H04M 15/60* (2013.01); *H04M 15/83* (2013.01); *H04M 15/84* (2013.01); *H04M 15/846* (2013.01); *H04M 15/85* (2013.01); *H04M 15/86* (2013.01); *H04W 4/24* (2013.01); *H04W 4/26* (2013.01); *H04W 24/02* (2013.01); *H04L 43/045* (2013.01); *H04M 1/72522* (2013.01); *H04M 15/775* (2013.01); *H04M 15/8044* (2013.01); *H04M 15/854* (2013.01); *H04M 15/856* (2013.01); *H04W 8/18* (2013.01)

(56) References Cited

U.S. PATENT DOCUMENTS

| | | | |
|---|---|---|---|
| 7,277,938 B2 | 10/2007 | Duimovich et al. | |
| 7,320,131 B1 | 1/2008 | O'toole, Jr. | |
| 7,406,596 B2 | 7/2008 | Tararukhina et al. | |
| 7,418,532 B2 | 8/2008 | Suzuki et al. | |
| 7,720,727 B2 | 5/2010 | Keyes et al. | |
| 7,904,080 B2 | 3/2011 | Atkins et al. | |
| 7,986,935 B1 | 7/2011 | D'souza et al. | |
| 8,064,876 B2 | 11/2011 | Knight | |
| 8,359,389 B1 | 1/2013 | Cohen et al. | |
| 8,484,568 B2 | 7/2013 | Rados et al. | |
| 8,542,661 B2 * | 9/2013 | Moeller | H04L 12/1428 370/338 |
| 2002/0029273 A1 | 3/2002 | Haroldson et al. | |
| 2002/0082991 A1 | 6/2002 | Friedman et al. | |
| 2003/0066055 A1 | 4/2003 | Spivey | |
| 2003/0115385 A1 | 6/2003 | Adamane et al. | |
| 2004/0040021 A1 * | 2/2004 | Bharati | G06F 11/0748 717/170 |
| 2004/0111712 A1 | 6/2004 | Humpert et al. | |
| 2004/0153587 A1 | 8/2004 | Choi | |
| 2004/0176965 A1 * | 9/2004 | Winch et al. | 705/1 |
| 2004/0199634 A1 | 10/2004 | Jackowski et al. | |
| 2006/0141983 A1 | 6/2006 | Jagannathan et al. | |
| 2006/0211404 A1 * | 9/2006 | Cromp et al. | 455/405 |
| 2006/0277224 A1 * | 12/2006 | Aftab | G06F 17/30575 |
| 2007/0211674 A1 | 9/2007 | Ragnar Karlberg et al. | |
| 2007/0294562 A1 | 12/2007 | Takamatsu et al. | |
| 2008/0318621 A1 | 12/2008 | Fan et al. | |
| 2009/0054030 A1 | 2/2009 | Golds | |
| 2009/0068980 A1 | 3/2009 | Creswell et al. | |
| 2009/0068984 A1 | 3/2009 | Burnett | |
| 2009/0138427 A1 | 5/2009 | Kalavade | |
| 2009/0172275 A1 | 7/2009 | Nochimowski et al. | |
| 2009/0196302 A1 | 8/2009 | Pastorino et al. | |
| 2009/0199196 A1 * | 8/2009 | Peracha | 718/104 |
| 2009/0203352 A1 | 8/2009 | Fordon et al. | |
| 2009/0285201 A1 | 11/2009 | Ben-haim et al. | |
| 2010/0015926 A1 | 1/2010 | Luff | |
| 2010/0017506 A1 | 1/2010 | Fadell | |
| 2010/0035576 A1 | 2/2010 | Jones et al. | |
| 2010/0130163 A1 | 5/2010 | Pousti | |
| 2010/0180190 A1 | 7/2010 | Carroll | |
| 2010/0191612 A1 | 7/2010 | Raleigh | |
| 2010/0318647 A1 | 12/2010 | Savoor et al. | |
| 2011/0019566 A1 | 1/2011 | Leemet et al. | |
| 2011/0087985 A1 | 4/2011 | Buchanan et al. | |
| 2011/0137776 A1 | 6/2011 | Goad et al. | |
| 2011/0145920 A1 | 6/2011 | Mahaffey et al. | |
| 2011/0151831 A1 | 6/2011 | Pattabiraman | |
| 2011/0176482 A1 | 7/2011 | Vizor et al. | |
| 2011/0211465 A1 | 9/2011 | Farrugia et al. | |
| 2011/0231551 A1 | 9/2011 | Hassan et al. | |
| 2011/0238826 A1 | 9/2011 | Carre et al. | |
| 2011/0244826 A1 | 10/2011 | Krishnan et al. | |
| 2011/0275344 A1 | 11/2011 | Momtahan et al. | |
| 2011/0276442 A1 | 11/2011 | Momtahan et al. | |
| 2012/0054661 A1 | 3/2012 | Rados et al. | |
| 2012/0101952 A1 | 4/2012 | Raleigh et al. | |
| 2012/0142310 A1 | 6/2012 | Pugh et al. | |
| 2012/0208495 A1 | 8/2012 | Lawson et al. | |
| 2012/0278194 A1 | 11/2012 | Dewan et al. | |
| 2012/0315872 A1 | 12/2012 | Amato et al. | |
| 2013/0023230 A9 | 1/2013 | Momtahan et al. | |
| 2013/0117846 A1 | 5/2013 | Mahaffey et al. | |
| 2013/0122882 A1 | 5/2013 | Patel et al. | |
| 2013/0149994 A1 * | 6/2013 | Gaddam et al. | 455/406 |
| 2014/0301218 A1 * | 10/2014 | Luo | H04W 4/26 370/252 |

FOREIGN PATENT DOCUMENTS

| | | |
|---|---|---|
| WO | 2012/083285 A2 | 6/2012 |
| WO | 2012/162419 A2 | 11/2012 |

OTHER PUBLICATIONS

Sinofsky, Steven, "Engineering Windows 8 for mobile networks", Retrieved at <<http://blogs.msdn.com/b/b8/archive/2012/01/20/engineering-windows-8-for-mobility.aspx>>, Jan. 20, 2012, pp. 28.
"Non-Final Office Action for U.S. Appl. No. 13/721,029", Mailed Date: Mar. 11, 2014, Filed Date: Dec. 20, 2012, 13 Pages.
"International Search Report & Written Opinion for PCT Patent Application No. PCT/US2013/022353", Mailed Date: May 15, 2013, Filed Date: Jan. 21, 2013, 10 Pages.
Heikkinen, et al.,"Measuring Mobile Peer-to-Peer Usage: Case Finland 2007", In Proceedings of the 10th International Conference on Passive and Active Network Measurement, Apr. 2009, pp. 165-174.
"Non-Final Office Action for U.S. Appl. No. 13/721,053", Mailed Date: Mar. 18, 2014, Filed Date: Dec. 20, 2012, 8 Pages.
"International Search Report & Written Opinion for PCT Patent Application No. PCT/US2013/022822", Mailed Date: Apr. 25, 2013, Filed Date: Jan. 24, 2013, 9 Pages.
Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.
Peddemors, Arjan, "Network Resource Awareness and Prediction on Mobile Devices", Novay PhD Research Series, No. 026 (Novay/PRS/026), Oct. 2009, 236 Pages.
Balasubramanian, Aruna, "Architecting Protocols to Enable Mobile Applications in Diverse Wireless Networks", A Dissertation Submitted to the Graduate School of the University of Massachusetts Amherst in Partial Fulfillment of the requirements for the Degree of Doctor of Philosophy, Feb. 2011, 198 Pages.
"Non-Final Office Action for U.S. Appl. No. 13/721,041", Mailed Date: Mar. 28, 2014, Filed Date: Dec. 20, 2012, 14 Pages.
"Non-Final Office Action for U.S. Appl. No. 13/721,023", Mailed Date: Mar. 28, 2014, Filed Date: Dec. 20, 2012, 15 Pages.
"Rapid Mobile Data Service Creation and Monetization", Retrieved at <<http://www.amdocs.com/Products/network-control/Documents/data-experience-solution-datasheet.pdf>>, 2012, 7 Pages.
"Non-Final Office Action for U.S. Appl. No. 13/721,032", Mailed Date: Feb. 6, 2014, Filed Date: Dec. 20, 2012, 10 Pages.
Unuth, Nadeem, "Data Usage Monitor Apps for Your iPhone and iPad", Retrieved Date: Oct. 8, 2012 Available at: http://voip.about.com/od/voipbandwidth/tp/Data-Usage-Monitor-Apps-For-Your-Iphone-And-Ipad.htm, 1 page.
"Non-Final Office Action for U.S. Appl. No. 13/721,058", Mailed Date: Apr. 16, 2014, Filed Date: Dec. 20, 2012, 10 Pages.
"Non-Final Office Action for U.S. Appl. No. 13/721,032", Mailed Date: Aug. 5, 2014, Filed Date: Dec. 20, 2012, 16 Pages.
"Applicant Initiated Interview Summary for U.S. Appl. No. 13/721,053", Mailed Date: May 30, 2014, Filed Date: Dec. 20, 2012, 3 Pages.

(56) References Cited

OTHER PUBLICATIONS

"Examiner Initiated Interview Summary for U.S. Appl. No. 13/721,053", Mailed Date: Aug. 19, 2014, Filed Date: Dec. 20, 2012, 2 Pages.
Notice of Allowance for U.S. Appl. No. 13/721,053, Mailed Date: Aug. 19, 2014, Filed Date: Dec. 20, 2012, 13 Pages.
"Final Office Action Issued in U.S. Appl. No. 13/721,023", Mailed Date: Oct. 27, 2014, 16 Pages.
"Final Office Action Issued in U.S. Appl. No. 13/721,029", Mailed Date: Oct. 1, 2014, 19 Pages.
"Search Report Issued in European Patent Application No. 13741633.5", Mailed Date: Sep. 18, 2014, 3 Pages.
"Non-Final Office Action Issued in U.S. Appl. No. 13/721,041", Mailed Date: Jan. 7, 2015, 20 Pages.
"Notice of Allowance Issued in U.S. Appl. No. 13/721,053", Mailed Date: Oct. 28, 2014, 7 Pages.
"Final Office Action Issued in U.S. Appl. No. 13/721,058", Mailed Date: Sep. 22, 2014, 15 Pages.
"Office Action Issued in European Patent Application No. 13741434.8", Mailed Date: Nov. 27, 2014, 6 Pages.
"Search Report Issued in European Patent Application No. 13741434.8", Mailed Date: Sep. 30, 2014, 3 Pages.
"Office Action Issued in European Patent Application No. 13741633.5", Mailed Date: Nov. 27, 2014, 7 Pages.
"Mobile Data Usage Meter—Manage Mobile Data Usage & Wireless Broadband Devices", Published on: Dec. 28, 2009, Available at: http://web.archive.org/web/20091228092436/http://www.telstrabusiness.com/business/portal/online/site/myaccount/mobiledatausagemeter.94003, 2 pages.
Rhee, Ed, "How to Track Data Usage on your Android Phone", Published on: Jul. 8, 2011, Available at: http://www.cnet.com/how-to/how-to-track-data-usage-on-your-android-phone/, 4 pages.

* cited by examiner

UPDATING DYNAMIC DATA USAGE PLANS AND STATISTICS

CROSS-REFERENCE TO RELATED APPLICATIONS

This application claims the benefit of U.S. Provisional Application No. 61/696,472, filed Sep. 4, 2012, U.S. Provisional Application No. 61/591,503, filed Jan. 27, 2012, and U.S. Provisional Application No. 61/591,509, filed Jan. 27, 2012. The entirety of these provisional applications is hereby incorporated by reference herein.

This application is related to the following applications: U.S. Pat. No. 8,977,231 entitled "Tracking Data Usage Under a Schematized Data Usage Plan," U.S. patent application Ser. No. 13/721,066 filed Dec. 20, 2012 entitled "Managing Data Transfers Over Network Connections Based on Priority and a Data Usage Plan," U.S. patent application Ser. No. 13/721,083 filed Dec. 20, 2012 entitled "On-Device Attribution of Network Data Usage," U.S. patent application Ser. No. 13/721,041 filed Dec. 20, 2012 entitled "Predicting Network Data Consumption Relative to Data Usage Patterns," U.S. patent application Ser. No. 13/721,029 filed Dec. 20, 2012 entitled "Data Usage Profiles for Users and Applications," U.S. patent application Ser. No. 13/721,023 filed Dec. 20, 2012 entitled "Recommendations for Reducing Data Consumption Based on Data Usage Profiles," U.S. Pat. No. 9,049,589 entitled "Dynamically Adjusting a Data Usage Plan Based on Data Usage Statistics," and U.S. patent application Ser. No. 13/721,058 filed Dec. 20, 2012 entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering simple unlimited mobile data plans to offering capped and metered plans. Some of these capped and metered plans are complex, with allotted data caps varying based on network type, time of day, etc. Further, the fees for exceeding the allotted data caps may be significant and may also vary based on network type, time of day, etc. The existing systems generally lack mechanisms to help the user understand and manage data consumption in view of the data usage plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure enable the collection and synchronization of data describing data usage plans and data usage statistics. A schema populated with data describing at least one data usage plan is received from at least one mobile operator. The data usage plan is associated with one or more user computing devices. The received, populated schema is distributed to the user computing devices. An updated portion of the schema is subsequently received from the mobile operator. The updated portion of the schema corresponds to an updated portion of the data usage plan. Only the received, updated portion of the schema is distributed to the user computing devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
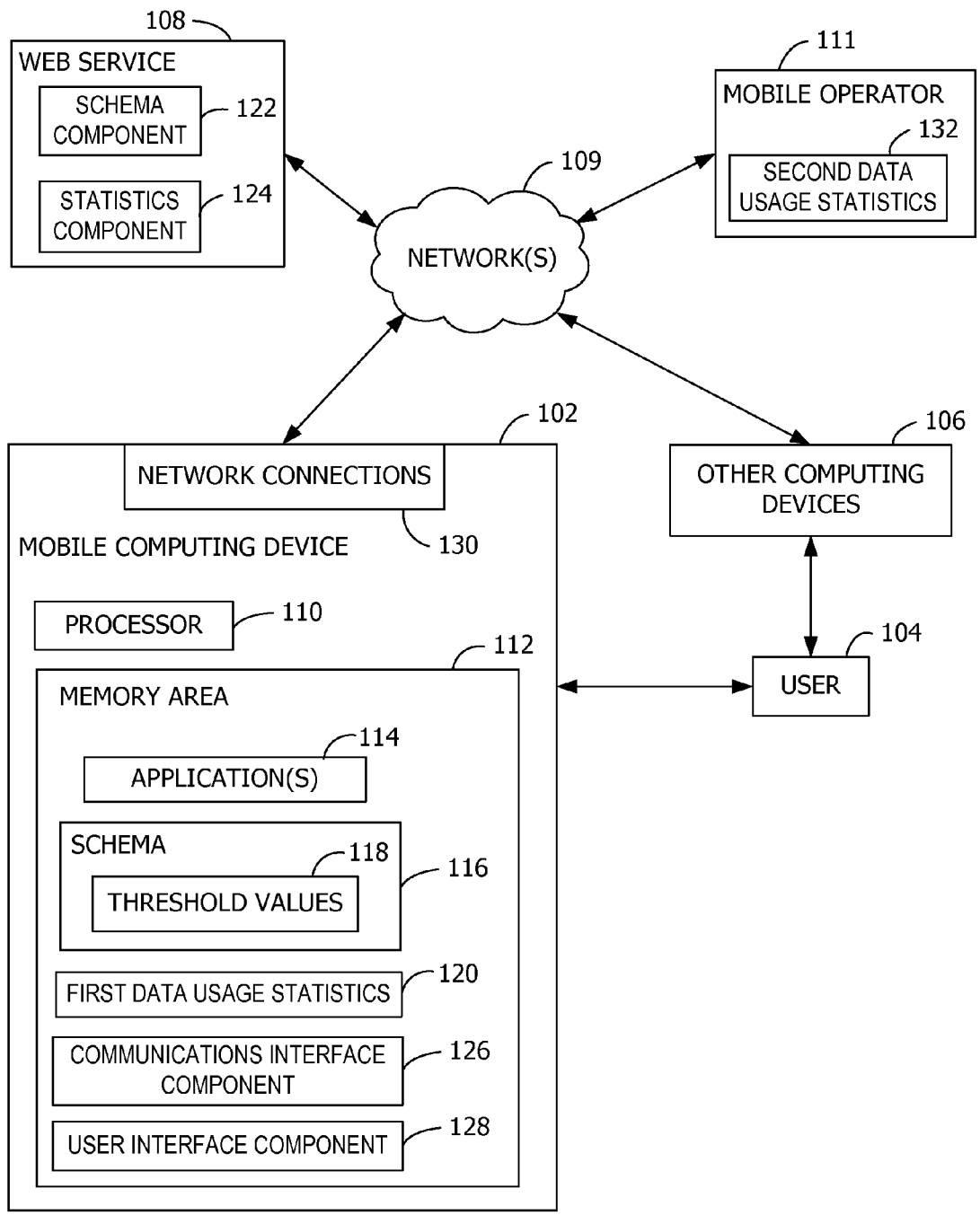
FIG. 1 is an exemplary block diagram illustrating a web service interacting with a mobile operator and user computing devices.

Referring to the figures, embodiments of the disclosure enable a centralized web service 108 to interact with user computing devices and mobile operators 111 to distribute data usage plans and to aggregate data usage statistics. For example, the web service 108 pulls information from the mobile operators 111 regarding customers (e.g., users 104) and pushes data usage plan changes or updates to a given user 104, segments of the users 104, or each of the users 104.

In some embodiments, the web service 108 receives a schema 116 populated with data relating to a data usage plan from the mobile operator 111 and distributes the populated schema 116 to one or more of the user computing devices. The data usage plan represents the terms and conditions (e.g., data consumption allotment) under which the mobile operator 111 provides data transfer services to the user computing devices. As the mobile operator 111 updates portions of the data usage plan, the web service 108 may receive and synchronize only the updated portions of the schema 116 with the user computing devices, in some embodiments. For example, the web service 108 does not distribute the other portions of the schema 116 that were not updated.

The web service 108 may further generate, monitor, collect, and/or receive the data usage statistics from the mobile operators 111 and from one or more of the user computing devices. The data usage statistics represent an amount of data consumed by the user computing devices under the data usage plan. The web service 108 reconciles any differences in the received data usage statistics, and sends a synchronization notification to the user computing devices based on the reconciliation.

Referring to FIG. 1, an exemplary block diagram illustrates the web service 108 interacting with the mobile operator 111 and user computing devices. The user computing devices include, for example, a mobile computing device 102 and other computing devices 106. The user computing devices communicate over one or more networks 109. In some embodiments, one or more of the user computing devices are associated with a data usage plan. For example, a plurality of the user computing devices may share data consumption allotted under the same or common data usage plan.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone (e.g., mobile telephone 404 in FIG. 4), laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108. The web service 108 may further store, or have access to, a computer-executable schema component 122 and a computer-executable statistics component 124. Operation of the schema component 122 and the statistics component 124, when executed, is described below with reference to FIG. 2.

For convenience in illustrating and describing FIG. 1, the mobile computing device 102 and the other computing devices 106 are associated with a common data usage plan of the user 104. For example, the mobile computing device 102 may represent the mobile telephone 404 of the user 104, while the other computing devices 106 may include a tablet and a laptop associated with the user 104.

In some embodiments, the mobile computing device 102 has at least one processor 110, a memory area 112, and at least one user interface (not shown). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures (e.g., FIG. 3).

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The mobile computing device 102 further establishes and maintains one or more network connections 130 representing communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic.

The memory area 112 further stores at least one schema 116. The schema 116 represents the data usage plan associated with the user 104 of the mobile computing device 102. For example, the user 104 has contracted with the mobile operator 111 to receive network data transfer services from the mobile operator 111. The data usage plan describes the services provided by the mobile operator 111, such as the amount of network data the user 104 can consume during a particular duration (e.g., a billing time period). For example, the data usage plan describes threshold values 118 associated with the network connections 130 of one or more devices of the user 104. The threshold values 118 represent the maximum amount of data consumption allotted under the data usage plan for the network connections 130. For example, one threshold value 118 may indicate the maximum amount of data consumption for a Wi-Fi connection, while another threshold value 118 indicates the maximum amount of data consumption for a cellular data connection.

The schema 116 may be defined by the web service 108, by the mobile operator 111, or by another entity. In general, the schema 116 enables descriptions of the parts, components, services, features, or other aspects of the data usage plan including, but not limited to, multi-rate data plans, peak times, roaming rates, allotted data consumption per network connection 130, etc. In some embodiments, the schema 116 allows the mobile operators 111 to send out updated portions of the schema 116 corresponding to updated parts of the data usage plan.

In some embodiments, the schema 116 includes a plurality of fields. Each of the threshold values 118 may be associated with one or more of the fields. For example, the fields may correspond to one or more of the following: peak times, off-peak times, peak time data consumption quota, off-peak time data consumption quota, peak time data consumption remaining, off-peak time data consumption remaining, a roaming rate and rules, a mobile operator name, a billing cycle type, a network connection type, identification of free hosts available for connection, a list of mobile hotspots, and any other elements or information pertaining to the data usage plan. The list of free hosts represents zero-rated or reduced cost hosts (e.g., visiting particular web sites does not count against the data usage plan).

The schema 116 may also include fields supporting different billing rates per host accessed, per weekend, per night, friends and family rates, peak and off-peak rates, and more. The schema 116 also allows each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema 116 stored by the mobile computing device 102 may also include fields corresponding to data usage statistics collected, generated, or received by the mobile computing device 102 and/or the mobile operators 111. For example, to facilitate sharing the data usage statistics among the mobile operators 111, web service 108, and/or user computing devices, the mobile operators 111, web service 108, and the user computing devices may populate the schema 116 with the data usage statistics.

While the schema 116 may take any form or structure, the schema 116 may be implemented as XML schema. Appendix A includes an exemplary XML schema for use in aspects of the disclosure.

The memory area 112 further stores exemplary computer-executable components such as a communications interface component 126 and a user interface component 128. In some embodiments, the communications interface component 126 includes a network interface card and/or computer-executable instructions (e.g., a driver) for operating the network interface card. In some embodiments, the communications interface is operable with near-field communication (NFC) tags.

The user interface component 128 may include a graphics card for displaying data to the user 104 and receiving data from the user 104. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device in a particular way.

Figure 2:
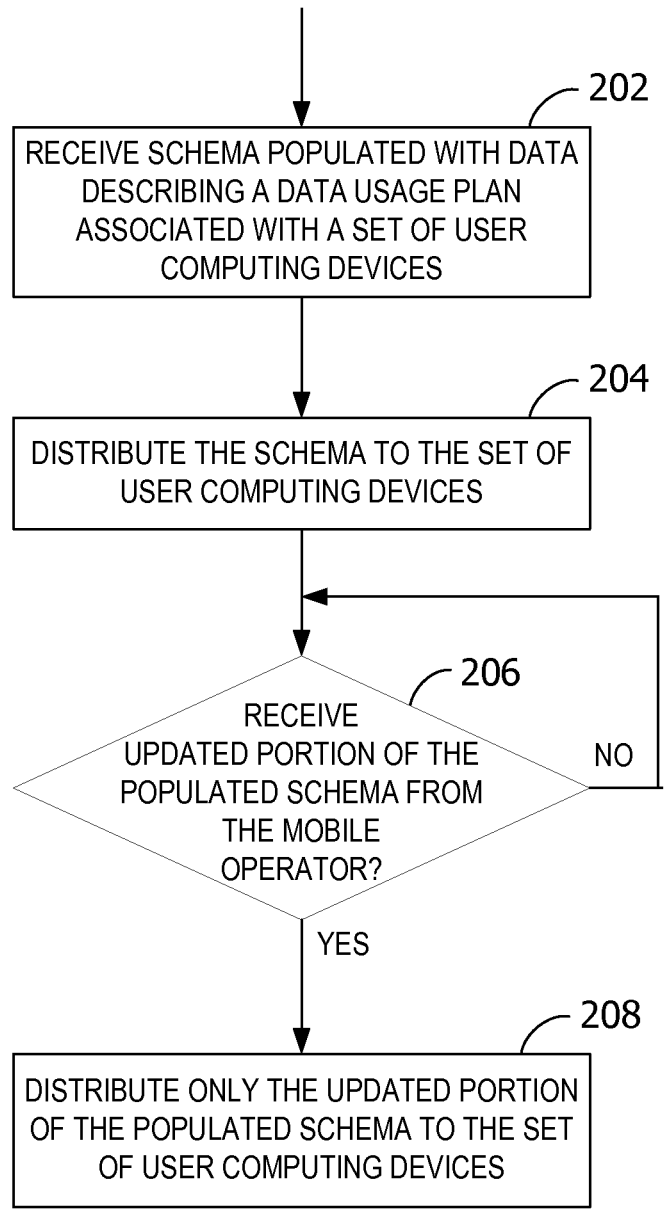
FIG. 2 is an exemplary flow chart illustrating operation of a web service to obtain and distribute data describing a data usage plan, or a portion thereof.

Referring next to FIG. 2, an exemplary flow chart illustrates operation of the web service 108 to obtain and distribute data describing a data usage plan, or a portion thereof. While the operations illustrated in FIG. 2 are performed by the web service 108 in some embodiments, one or more of the operations may be performed by other devices, including any computing device local to, or remote from, the user 104. For example, the operations may be performed by a proxy device in communication with the web service 108. Alternatively or in addition, the operations illustrated in FIG. 2 may be performed by an operating system executing on the mobile computing device 102.

At 202, the web service 108 receives, from at least one of the mobile operators 111, the schema 116 populated with data describing the data usage plan associated with one or more of the user computing devices. At 204, the web service 108 distributes the received, populated schema 116 to the user computing devices. Subsequently, the web service 108 may receive at 206 an updated portion of the schema 116 from the mobile operator 111. The updated portion of the schema 116 corresponds to an updated portion of the data usage plan. For example, the mobile operator 111 may update one or more of the following: roaming agreements, fallback plans, free hosts, mobile hotspots, and any other element and information pertaining to the user's data plan that has an impact on data usage, cost, and/or tariff.

The web service 108 distributes only the received, updated portion of the schema 116 to the user computing devices at 208. In this manner, the mobile operator 111 is able to update portions of the data usage plan and push only those updated portions (e.g., not the entire data usage plan) to subscribers (e.g., user 104), thus reducing the amount of network data consumed. In embodiments in which there are multiple updated portions of the schema 116, the web service 108 may decide to distribute the updated portions in separate batches, such as at different times or during particular time intervals. In this manner, the web service 108 is able to take advantage of reduced cost network transfers (e.g., off-peak times) to reduce or at least manage the network data consumption of the user computing devices.

Rather than distributing the populated schema 116 or portions thereof, the web service 108 may send a notification to the user computing devices to synchronize their version of the populated schema 116 with that of the web service 108. In such embodiments, upon receipt of the notification from the web service 108, one or more of the user computing devices may send a synchronization request to the web service 108. Upon receipt of the synchronization request, the web service 108 provides the populated schema 116 or updated portions of the schema 116 to the requesting user computing devices.

In some embodiments, the web service 108 may store, or have access to, one or more computer-executable components for implementing one or more of the operations illustrated in FIG. 2. For example, the schema component 122, when executed by the web service 108, receives from the mobile operator 111 the schema populated with data describing the data usage plan associated with one or more of the user computing devices. The schema component 122 distributes the received, populated schema to the user computing device. Subsequently, the web service 108 receives, from the mobile operator 111, an updated portion of the schema 116. The updated portion of the schema 116 corresponds to an updated portion of the data usage plan (e.g., as updated by the mobile operator 111 such as when changing terms of the data usage plan). The schema component 122 then distributes only the received, updated portion of the schema 116 to the user computing device.

In some embodiments, the web service 108 may further collect, reconcile, and distribute data usage statistics to the user computing devices. The data usage statistics may be viewed as a current or instant snapshot of the amount of data transmitted and/or received (e.g., consumed) by the computing devices of the user 104 that share the data usage plan. The web service 108 may collect information relating to text messages, data, voice calls, minutes used, voice over Internet Protocol (VoIP) usage, and any other element of usage consumed by, or that impacts, the user computing devices to produce the data usage statistics. The data usage statistics identify, to a granularity of time (e.g., per minute) or data (e.g., per kilobyte), how much data has been sent and/or received by the mobile computing device 102 or other user computing devices and over which network connections 130. Other data usage statistics are contemplated, however. For example, the data usage statistics may further identify the time and day of usage, location of usage, network connection 130, technology usage, the subscriber identity module (SIM) card or other user identity module used for dual SIM scenarios, the international mobile station equipment identity (IMEI) or other device identifier for multi-device scenarios, the Internet protocol (IP) address or other address of the access point used for Wi-Fi scenarios, the IP address or other address of the target computer (e.g., for whitelist/blacklists in data usage), the application responsible for the data transfer, etc. In some examples, the web service 108 tracks or monitors network data consumption by the user computing devices by compiling the data usage statistics directly (e.g., monitor network traffic) and/or by collecting the data usage statistics from the mobile computing device 102 (or other user computing devices) and/or the mobile operator 111.

For example, the web service 108 may collect, monitor, or generate first data usage statistics 120 from the mobile computing device 102 and second data usage statistics 132 from the mobile operator 111. In some embodiments, the first data usage statistics 120 represent network data consumed under the data usage plan by the mobile computing device 102 as determined and/or measured (e.g., collected and stored) by the mobile computing device 102. For example, the mobile computing device 102 collects ongoing usage data relating to network data transfers, such as from device radios, drivers, and accelerometers.

In other embodiments, the first data usage statistics 120 represent network data consumed under the data usage plan by each of the user computing devices, not just the mobile computing device 102. In such embodiments, the mobile computing device 102 receives updates of network data consumption by the other user computing devices sharing the same data usage plan. The second data usage statistics 132 represent network data consumed under the data usage plan by the mobile computing device 102 as determined and/or measured (e.g., collected and stored) by the mobile operator 111. In other embodiments, the second data usage statistics 132 represent network data consumed under the data usage plan by each of the user computing devices, not just the mobile computing device 102. In such embodiments, the mobile operator 111 monitors network data consumption by the other user computing devices sharing the same data usage plan. For example, the second data usage statistics 132 may represent the network data collectively consumed by the mobile telephone 404, tablet, and laptop of the user 104.

In a further example, one or more of the mobile operators 111 collect data usage statistics corresponding to a plurality of data usage plans. In such an example, there may a plurality of sets of data usage statistics (e.g., one set for each data usage plan or user 104).

In some embodiments, the mobile operator 111 may have more current and/or more accurate data usage statistics 120 for one or more of the user computing devices than the user computing devices. For example, the mobile operator 111 may have more current and/or more accurate data usage statistics 120 for particular network connections 130 than the user computing devices. The mobile operator 111 may push, or transmit upon demand, such data usage statistics 120 to the web service 108. The web service 108 integrates or otherwise reconciles the data from the mobile operator 111 and/or the user computing devices to produce the data usage statistics 120.

For example, if differences exist in the data usage statistics received from the mobile computing device 102 and from the mobile operator 111 (e.g., the data from the mobile operator 111 may be 24-48 hours old), the web service 108 reconciles the differences to provide the user 104 with the most current information. Reconciling the differences includes, for example, examining time stamps or other collection dates and favoring, weighting, or choosing the more recently collected data. For example, the web service 108 may compare a timestamp associated with the first data usage statistics 120 and a timestamp associated with the second data usage statistics 132 to determine which of the data usage statistics is more recent or up-to-date. Based on the reconciling, the web service 108 may send a notification to one or more of the user computing devices. In such embodiments, upon receipt of the notification from the web service 108, one or more of the user computing devices may send a synchronization request to the web service 108. For example, the web service 108 identifies those user computing devices that have outdated data usage statistics.

Upon receipt of the synchronization request from the user computing devices, the web service 108 provides the most recent or up-to-date data usage statistics to those requesting user computing devices. For example, the web service 108 may provide the second data usage statistics 132 (e.g., from the mobile operator 111) to the requesting user computing devices.

In some embodiments, the web service 108 executes the statistics component 124 to collect and analyze the data usage statistics. The statistics component 124, when executed by the web service 108, receives the first data usage statistics 120 as collected by the user computing device and the second data usage statistics 132 as collected by the mobile operator 111. The statistics component 124 reconciles the first data usage statistics 120 and the second data usage statistics 132, and sends a synchronization notification to the user computing device based on the reconciliation. For example, if the statistics component 124 determines that the first data usage statistics 120 collected or maintained by the user computing device is out-of-date, the web service 108 sends the synchronization notification to the user computing device. In response to receiving the synchronization notification, the user computing device synchronizes the first data usage statistics 120 with the second data usage statistics 132 (e.g., compares timestamps associated with the first data usage statistics 120 and the second data usage statistics 132). For example, the user computing device may replace the first data usage statistics 120 with the second data usage statistics 132.

The web service 108 may store the schema component 122 and the statistics component 124 on one or more computer storage media. Further, the schema component 122 and the statistics component 124 may execute independently of each other (e.g., not sequentially, or without interaction or dependency between the two components). For example, the schema component 122 and the statistics component 124 may each be executed by a separate thread.

Figure 3:
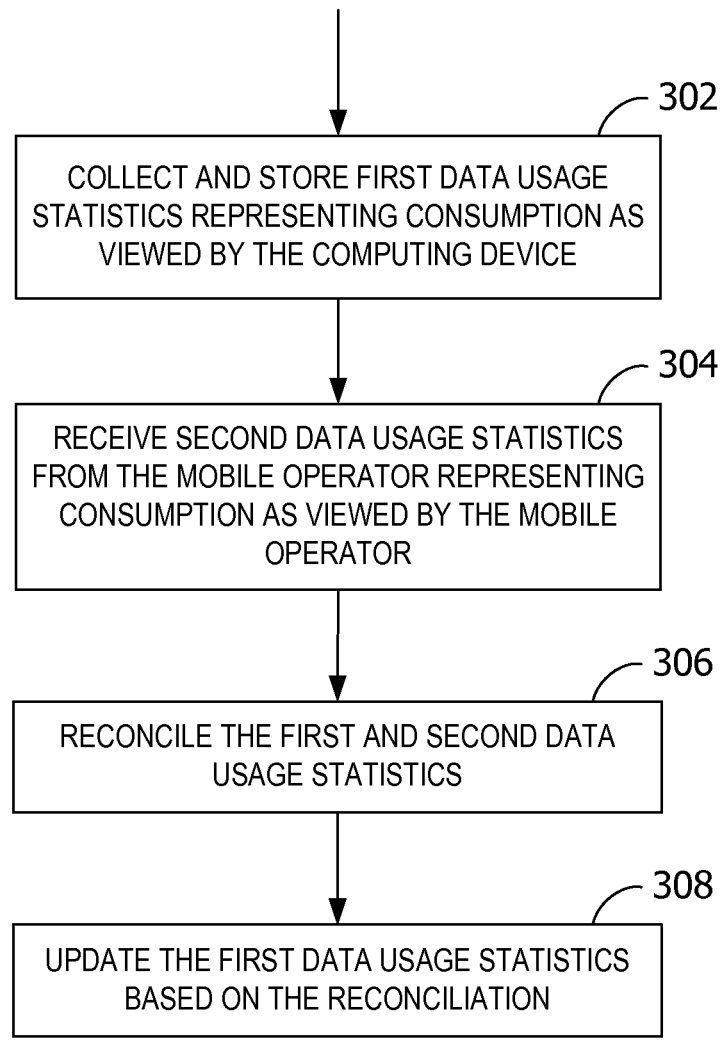
FIG. 3 is an exemplary flow chart illustrating operation of a computing device to collect and reconcile data usage statistics describing data consumed under a data usage plan.

Referring next to FIG. 3, an exemplary flow chart illustrates operation of a computing device such as the mobile computing device 102 to collect and reconcile data usage statistics describing network data consumed under the data usage plan. While the operations illustrated in FIG. 3 are performed by the computing device of the user 104 in some embodiments, one or more of the operations may be performed by other devices, including any computing device local to, or remote from, the user 104. For example, the operations may be performed by a proxy device in communication with the computing device. As an example, the operations illustrated in FIG. 3 may be performed by an operating system executing on the mobile computing device 102.

At 302, the computing device collects data usage statistics (e.g., the first data usage statistics 120) relating to the data usage plan. The first data usage statistics 120 represent network data consumption under the data usage plan by the computing device as determined by the computing device. The computing device stores the collected first data usage statistics 120 in, for example, the memory area 112. At 304, the computing device receives data usage statistics (e.g., the second data usage statistics 132) relating to the data usage plan. The second data usage statistics 132 represent network data consumption under the data usage plan by the computing device as determined by the mobile operator 111.

At 306, the computing device reconciles the collected first data usage statistics 120 and the received second data usage statistics 132. For example, the computing device may compare timestamps associated with the first data usage statistics 120 and the second data usage statistics 132 to identify the more recent, or up-to-date, measure of network data consumption under the data usage plan. At 308, the computing device updates the first data usage statistics 120 based on the reconciliation. For example, the computing device may conclude that the first data usage statistics 120 are more recent and hence more accurately represent current, cumulative network data consumption than the second data usage statistics 132. In such an example, the computing device makes no changes to the collected first data usage statistics 120.

As another example, the computing device may conclude that the second data usage statistics 132 are more recent and hence more accurately represent current, cumulative network data consumption than the first data usage statistics 120. In such an example, the computing device may replace the first data usage statistics 120 stored in the memory area 112 with the second data usage statistics 132.

As described with reference to FIG. 3, the first data usage statistics 120 represent network data consumed by the computing device, as monitored by the computing device. In other embodiments, the first data usage statistics 120 may represent network data consumed by the computing device and the other computing devices 106 sharing the data usage plan. For example, the computing device may collect the first data usage statistics 120 by receiving at least a portion of the first data usage statistics 120 from these other computing devices 106 associated with the data usage plan. In such embodiments, after reconciling the data usage statistics (e.g., updating the first data usage statistics 120 with the second data usage statistics 132), the computing device may send the updated first data usage statistics 120 to the other computing devices 106 based on the reconciliation. Alternatively or in addition, the computing device may send a synchronization notification to the other computing devices 106 prompting those computing devices to synchronize the data usage statistics with those from the computing device.

Figure 4:
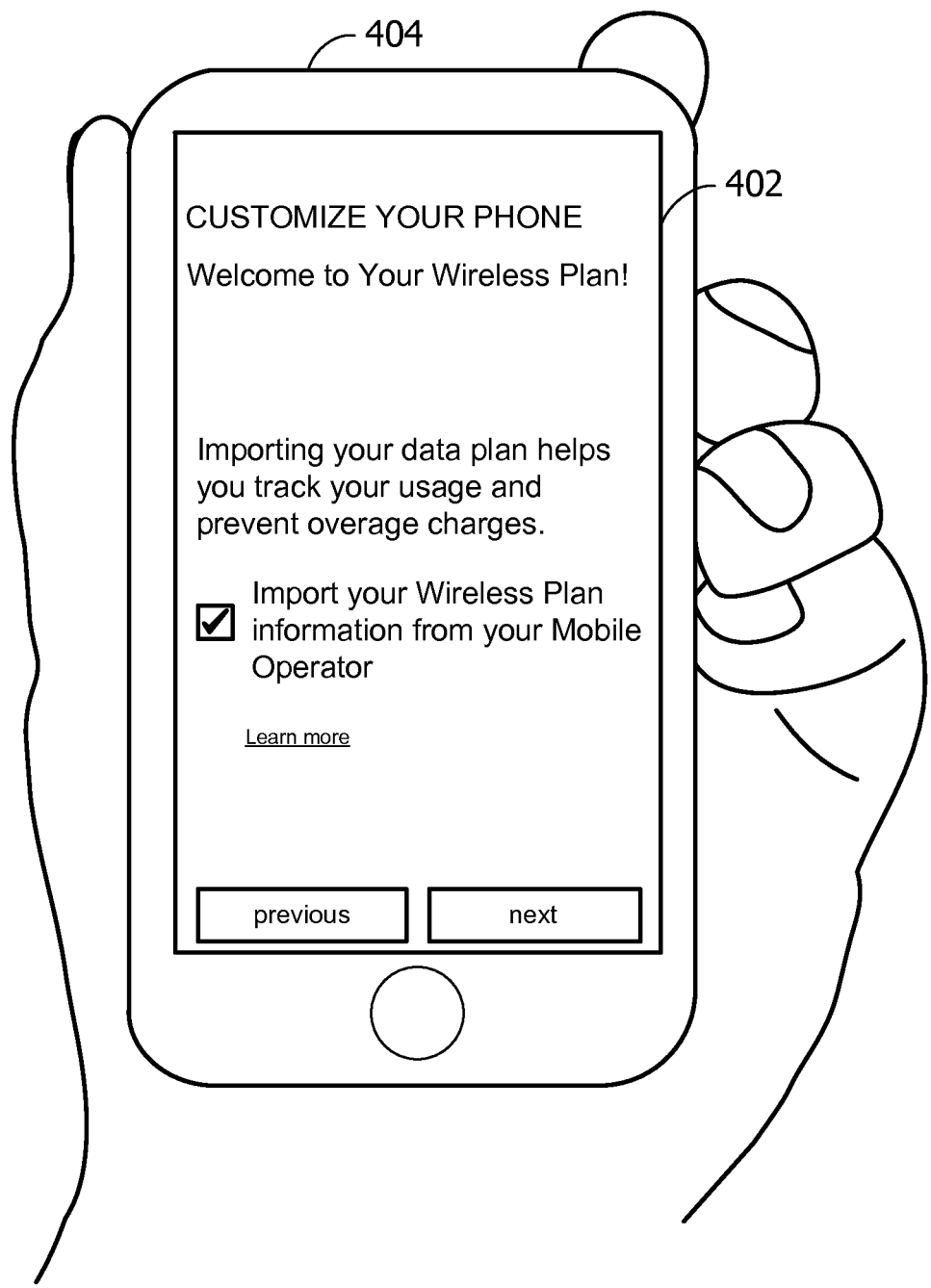
FIG. 4 is an exemplary user interface illustrating configuration options for importing data describing a data usage plan.

Referring next to FIG. 4, an exemplary user interface 402 on the mobile telephone 404 illustrates configuration options for importing data describing the data usage plan. In the example of FIG. 4, the user 104 is able to explicitly opt-in or opt-out of receiving the schema 116 populated with the data usage plan. For example, the mobile telephone 404 asks permission from the user 104 to retrieve the wireless plan details to help avoid overcharges. The user 104 checks a checkbox to import the populated schema 116. In response, the mobile telephone 404 requests the populated schema 116 from the mobile operator 111 and, upon receipt from the mobile operator 111, the mobile telephone 404 stores the populated schema 116 in the memory area 112.

Figure 5:
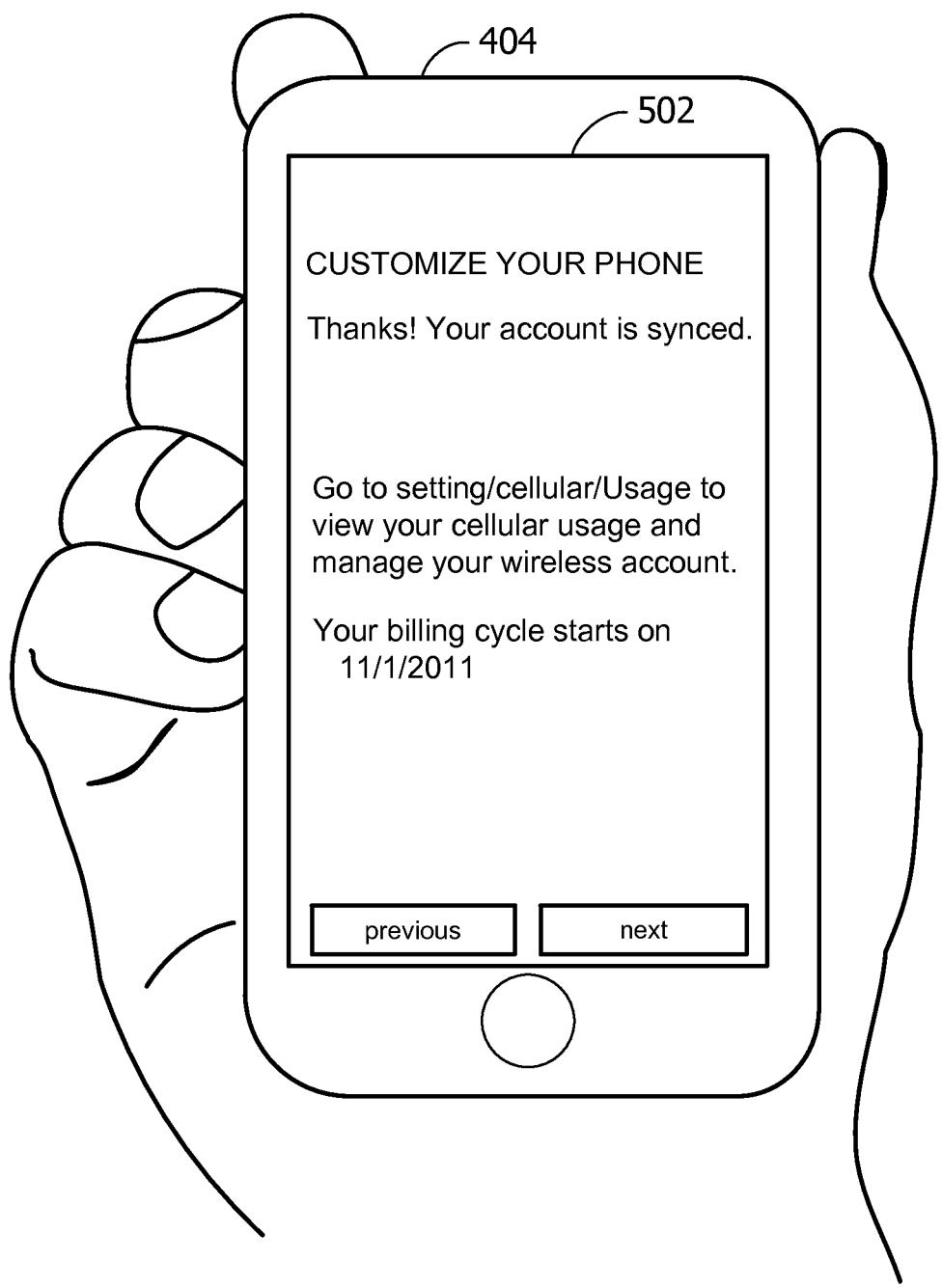
FIG. 5 is an exemplary user interface illustrating synchronization of data describing a data usage plan.

Referring next to FIG. 5, an exemplary user interface 502 illustrates completion of synchronization of data describing the data usage plan. In the example of FIG. 5, the user 104 has opted-in to obtaining, from the mobile operator 111, the schema 116 populated with the data usage plan that the user 104 and mobile operator 111 have agreed upon. The user 104 receives confirmation that the details of the data usage plan have been downloaded, as displayed in the user interface 502 of the mobile telephone 404. The populated schema 116 includes details of the data usage plan, such as the start date of the billing cycle. The user interface 502 in FIG. 5 further displays the start date of the billing cycle to the user 104. The user interface 502 also displays a message telling the user 104 how to check current usage and modify account settings.

Figure 6:
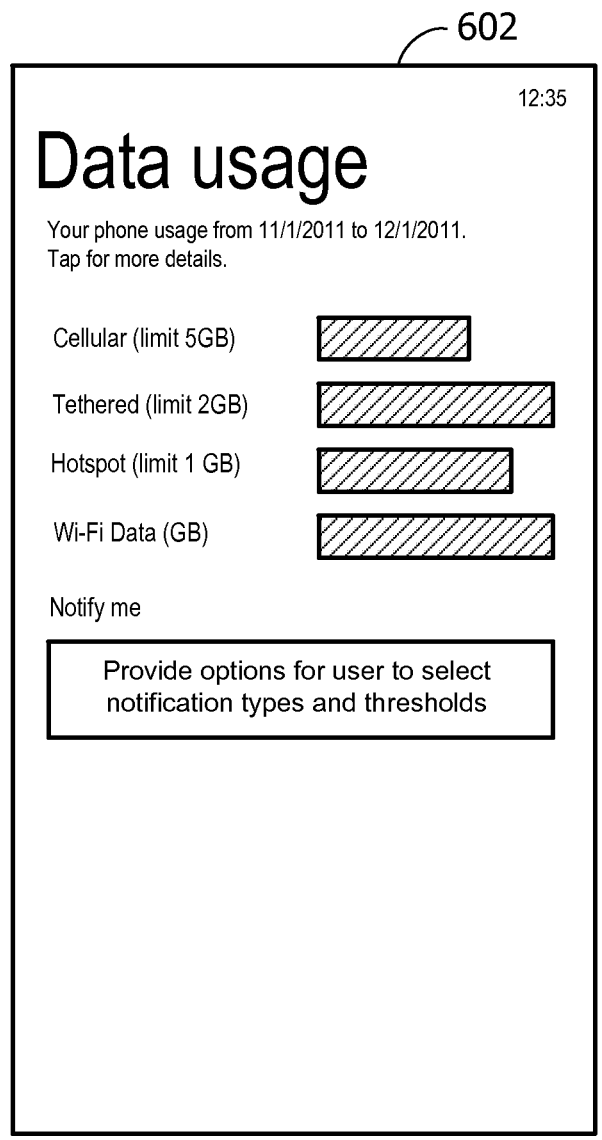
FIG. 6 is an exemplary user interface illustrating a summary of network data usage with different types of network connections.

Referring next to FIG. 6, an exemplary user interface 602 illustrates a summary of network data usage with different types of network connections 130. While the proportions of the user interfaces 602, 702, 704, 706 illustrated in FIG. 6, FIG. 7A, FIG. 7B, FIG. 7C, and FIG. 8 are shown to conform to a screen of the mobile computing device 102 (e.g., the mobile telephone 404), the content displayed within the user interfaces 602, 702, 704, 706 may be shown in any format on any of the user computing devices.

In FIG. 6, data usage for a plurality of the network connections 130 is shown to the user 104 in the user interface 602. In particular, data usage statistics 120 attributed to each of the network connections 130 is shown. For example, the amounts of data transmitted and/or received over a cellular network connection, a tethered network connection, a Hotspot network connection, and a Wi-Fi network connection are shown. The amounts of data are represented by proportionally-sized horizontal bars.

The user interface 602 also displays the threshold values 118 associated with each of the network connections 130. The threshold values 118 are taken from the data usage plan. For example, the data usage plan indicates that the user 104 has a maximum of 5 gigabytes (GB) of data usage available for the cellular network connection, 2 GB of data usage for the tethered network connection, 1 GB of data usage for the Hotspot network connection, and an unlimited amount of data usage for the Wi-Fi network connection.

The user interface 602 in FIG. 6 may also display a button or bar that, when selected by the user 104 (e.g., clicked or touched), the user interface 602 allows the user 104 to select options or other configuration settings for receiving notifications. The notifications are sent when the amounts of data transmitted and/or received over the various network connections 130 reaches particular values (e.g., set by the user 104, mobile computing device 102, mobile operator 111, or other entity).

Figures 7A, 7B, 7C:
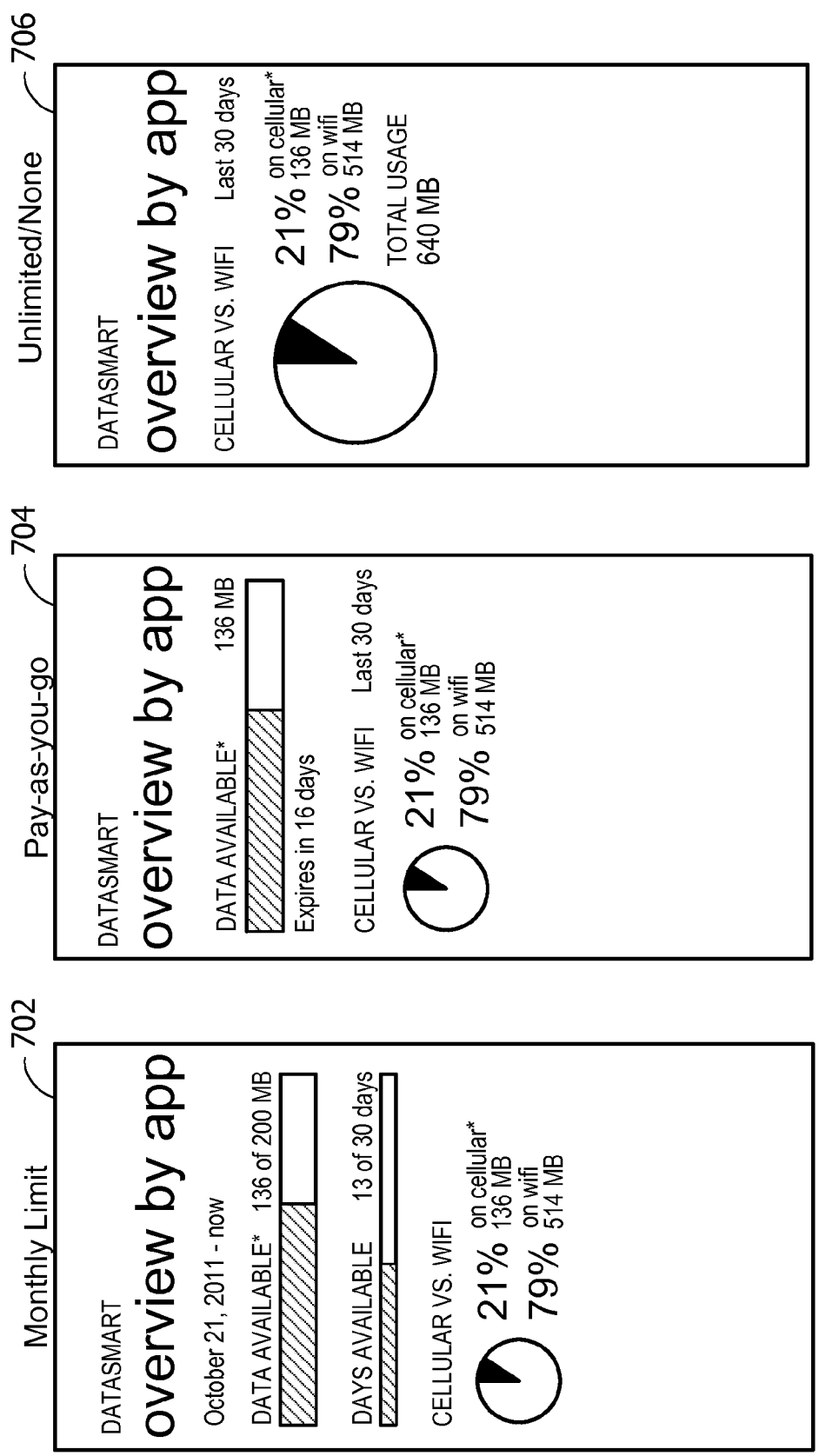
FIG. 7A is an exemplary user interface illustrating data usage by a mobile computing device consuming network data under a data usage plan with a monthly limit.
FIG. 7B is an exemplary user interface illustrating data usage by a mobile computing device consuming network data under a pay-as-you-go data usage plan.
FIG. 7C is an exemplary user interface illustrating data usage by a mobile computing device consuming network data under a data usage plan with unlimited data usage.

Referring next to FIG. 7A, an exemplary user interface 702 illustrates data usage by the mobile computing device 102 consuming network data under the data usage plan having a monthly limit. While the overviews of data usage illustrated in FIG. 7A, FIG. 7B, and FIG. 7C indicate that the data usage statistics 120 shown are per application 114, the user interfaces 702, 704, 706 may alternatively or in addition display an overview of aggregated data usage across the applications 114 on the mobile computing device 102. Further, the user interfaces 702, 704, 706 may alternatively or in addition display an overview of data usage per computing device of the user 104 or aggregated across a plurality of the computing devices of the user 104. For example, the different statistics may be shown in different tabs or tiles in the user interfaces 702, 704, 706. In an example involving a family or shared data plan, the statistics for each plan member may be shown in separate tiles.

In FIG. 7A, the data usage statistics 120 include the amount of network data remaining for use (e.g., the remainder of the monthly limit specified by the data usage plan), the amount of network data used during the current billing period, and the quantity of time (e.g., days) remaining within the current billing period. The data usage statistics 120 also indicate a breakout of the data usage, such as the amount of data consumed under a cellular network connection versus the amount of data consumed under a Wi-Fi network connection.

Referring next to FIG. 7B, an exemplary user interface 704 illustrates data usage by the mobile computing device 102 consuming network data under a pay-as-you-go data usage plan. In FIG. 7B, the data usage statistics 120 include the amount of network data consumption remaining for use (e.g., the remainder of the pay-as-you-go amount specified by the data usage plan), the amount of network data consumed recently (e.g., within the last 30 days), and the quantity of time (e.g., days) remaining. For example, the remaining cellular data consumption expires in 16 days. The data usage statistics 120 also indicate a breakout of the data usage, such as the amount of data consumed under a cellular network connection versus the amount of data consumed under a Wi-Fi network connection.

Referring next to FIG. 7C, an exemplary user interface 706 illustrates data usage by the mobile computing device 102 consuming network data under the data usage plan with unlimited data usage. In FIG. 7C, the data usage statistics 120 include the amount of network data consumed recently (e.g., within the last 30 days). The data usage statistics 120 also indicate a breakout of the data usage, such as the amount of data consumed under a cellular network connection versus the amount of data consumed under a Wi-Fi network connection. The data usage statistics 120 also indicate a total amount of usage by the mobile computing device 102.

Figure 8:
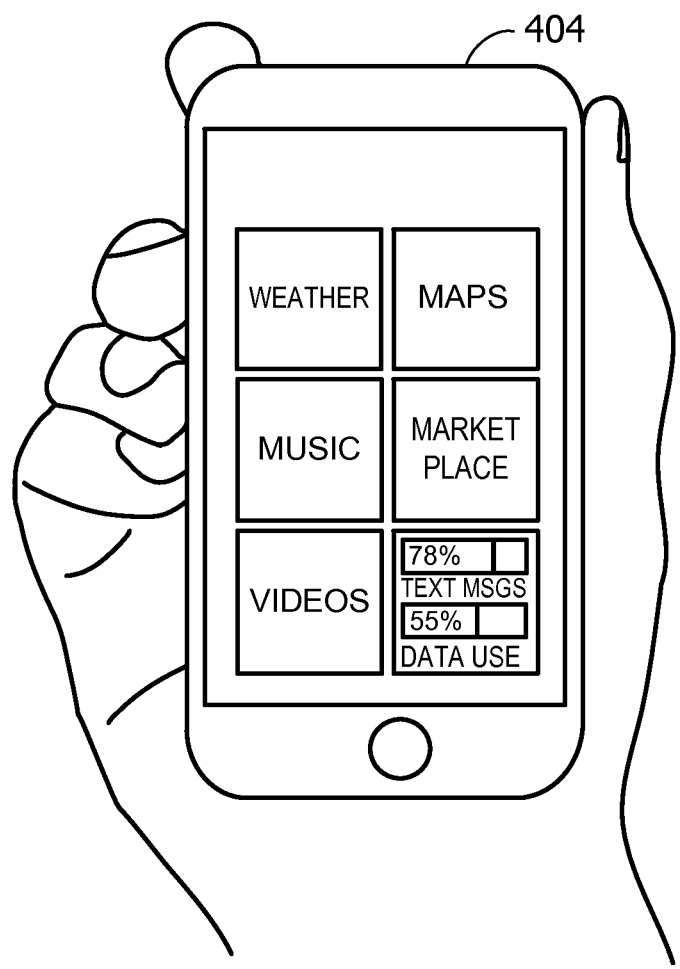
FIG. 8 is an exemplary block diagram illustrates a mobile computing device having a tile for displaying network data usage statistics to a user.

Referring next to FIG. 8, an exemplary block diagram illustrates the mobile computing device 102 as the mobile telephone 404 having a tile for displaying the data usage statistics 120 to the user 104. The mobile telephone 404 displays a plurality of tiles (e.g., active tiles) that may be updated with the data usage statistics 120. In some embodiments, tiles represent tile user interface elements. In the example of FIG. 8, the mobile telephone 404 indicates that 78% of the allotment for text messages has been consumed, while 55% of the allotment for data usage has been consumed.

Additional Examples

In an example scenario, the user 104 has several user computing devices associated with the same data usage plan. For example, the user 104 has a smartphone, a tablet, and a basic cellular telephone. In this example, the user 104 also has two subscriber identity module (SIM) cards or other user identity modules (e.g., two universal integrated circuit cards), each associated with a different data usage plan. Over time, the user 104 moves the SIM cards among the smartphone, tablet, and cellular telephone. After the user 104 installs one of the SIM cards in one of the devices, aspects of the disclosure execute on that device to detect the new SIM card and to communicate with the mobile operator 111 associated with the SIM card to obtain the schema 116 populated with the data usage plan associated with the SIM card. The user 104 is then able to view details of the data usage plan associated with that SIM card, such as the allotments per network connection 130 and remaining data consumption for the current billing cycle.

In another example scenario, the computing device may share the populated schema 116, or portions thereof, with other devices upon demand or request. For example, the user 104 may tether the computing device to a friend's computing device (e.g., configure the computing device to be a wireless access point). The friend's computing device communicates with the user's computing device to obtain the schema 116 populated with the data usage plan. The friend is then able to view an amount of data consumption remaining under the data usage plan associated with the user 104 thus enabling the friend to decide whether, and how much, network data may be consumed.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. Computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for collecting and reconciling the first data usage statistics 120 (e.g., as collected by the user computing devices) and the second data usage statistics 132 (e.g., as collected by the mobile operators 111), and exemplary means for synchronizing the first data usage statistics 120 with the second data usage statistics 132.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Listed below are exemplary schema portions that are operable in aspects of the disclosure. While written in extensible markup language (XML) format, the schema may be implemented in other formats.

```
<?xml version="1.0" encoding="UTF-8"?>
<xs:schema xmlns:xs="Base/v1"
elementFormDefault="qualified"
targetNamespace="CarrierControl/Base/v1">
    <!-- Basic types -->
    <xs:simpleType name="NameType">
        <xs:restriction base="xs:normalizedString">
            <xs:minLength value="1"/>
            <xs:maxLength value="255"/>
            <xs:whiteSpace value="collapse"/>
        </xs:restriction> </xs:simpleType>
    <xs:simpleType name="Priority">
        <xs:restriction base="xs:nonNegativeInteger">
            <xs:maxExclusive value="10"/>
        </xs:restriction>
    </xs:simpleType>
    <xs:simpleType name="GUID">
        <xs:annotation>
            <xs:documentation xml:lang="en"> The representation of a GUID,
generally the id of an element. </xs:documentation>
        </xs:annotation>
```

```
    <xs:restriction base="xs:token">
        <xs:pattern value="\{[a-fA-F0-9]{8}-[a-fA-F0-9]{4}-[a-fA-F0-9]{4}-[a-fA-F0-9]{4}-[a-fA-F0-9]{12}\}"/>
    </xs:restriction>
</xs:simpleType>
<xs:simpleType name="SubscriberType">
    <xs:restriction base="xs:token">
        <xs:maxLength value="20"/>
        <xs:pattern value="\w+"/>
    </xs:restriction>
</xs:simpleType>
<xs:complexType name="CertificateDetails">
    <xs:annotation>
        <xs:documentation> Used to identify a certificate or set of certificates. SubjectName is compared against the DN provided as the certificate's Subject field, or against any Name provided in the SubjectAlternativeName extentions of type DirectoryName. IssuerName is compared against the DN provided as the certificate's Issuer field, or against any Name provided in the IssuerAlternativeName extentions of type DirectoryName. </xs:documentation>
    </xs:annotation>
    <xs:sequence>
        <xs:element name="SubjectName" type="xs:string"/>
        <xs:element name="IssuerName" type="xs:string"/>
    </xs:sequence>
</xs:complexType>
<!-- Alias definitions -->
<xs:element name="AliasList">
    <xs:complexType>
        <xs:sequence>
            <xs:element maxOccurs="unbounded" ref="AliasDefinition"/>
        </xs:sequence>
    </xs:complexType>
</xs:element>
<xs:complexType name="AliasDefinitionBaseType">
    <xs:attribute name="Name" type="xs:string"/>
</xs:complexType>
<xs:element name="AliasDefinition" type="AliasDefinitionBaseType" abstract="true"/>
<!-- Locations -->
<xs:simpleType name="ProviderNameType">
    <xs:restriction base="xs:normalizedString">
        <xs:minLength value="1"/>
        <xs:maxLength value="20"/>
        <xs:whiteSpace value="collapse"/>
    </xs:restriction>
</xs:simpleType>
<xs:simpleType name="ProviderIdType">
    <xs:restriction base="xs:token">
        <xs:pattern value="\d{1,6}"/>
    </xs:restriction>
</xs:simpleType>
<xs:complexType name="ProviderType">
    <xs:sequence>
        <xs:element name="ProviderID" type="ProviderIdType"/>
        <xs:element name="ProviderName" type="ProviderNameType"/>
    </xs:sequence>
</xs:complexType>
<xs:complexType name="LocationType">
    <xs:choice maxOccurs="unbounded">
        <xs:element name="Provider" type="ProviderType"/>
        <xs:element name="LocationAlias" type="xs:string"/>
    </xs:choice>
    <xs:attribute name="negate" type="xs:boolean" default="false"/>
</xs:complexType>
<xs:element name="LocationAliasDefinition" type="LocationAliasDefinitionType" substitutionGroup="AliasDefinition"/>
<xs:complexType name="LocationAliasDefinitionType">
    <xs:complexContent>
        <xs:extension base="AliasDefinitionBaseType">
            <xs:sequence>
                <xs:element name="Location" type="LocationType"/>
            </xs:sequence>
        </xs:extension>
    </xs:complexContent>
</xs:complexType>
<!-- Times -->
<xs:complexType name="TimeType">
    <xs:choice maxOccurs="unbounded">
```

```
            <xs:element name="TimePeriod" type="TimePeriod"/>
            <xs:element name="RecurringTimePeriod"
type="RecurringTimePeriod"/>
            <xs:element name="TimeAlias" type="xs:string"/>
        </xs:choice>
        <xs:attribute name="negate" type="xs:boolean" default="false"/>
    </xs:complexType>
    <xs:element name="TimeAliasDefinition" type="TimeAliasDefinitionType"
substitutionGroup="AliasDefinition"/>
    <xs:complexType name="TimeAliasDefinitionType">
        <xs:complexContent>
            <xs:extension base="AliasDefinitionBaseType">
                <xs:sequence>
                    <xs:element name="Time" type="TimeType"
maxOccurs="unbounded"/>
                </xs:sequence>
            </xs:extension>
        </xs:complexContent>
    </xs:complexType>
    <xs:simpleType name="TimeOfWeek">
        <xs:annotation>
            <xs:documentation> Defines a time as an offset from the midnight
preceding 12:00:01 AM Sunday (P0D) to the midnight following 11:59:59 PM
Saturday (P7D). </xs:documentation>
        </xs:annotation>
        <xs:restriction base="xs:duration">
            <xs:minInclusive value="P0D"/>
            <xs:maxInclusive value="P7D"/>
        </xs:restriction>
    </xs:simpleType>
    <xs:complexType name="RecurringTimePeriod">
        <xs:annotation>
            <xs:documentation> Defines a period of time within the week as a
start/end TimeOfWeek. If EndTime is less than StartTime, the period is interpreted as
crossing Saturday night. </xs:documentation>
        </xs:annotation>
        <xs:attribute name="StartTime" type="TimeOfWeek" use="required"/>
        <xs:attribute name="EndTime" type="TimeOfWeek" use="required"/>
    </xs:complexType>
    <xs:complexType name="TimePeriod">
        <xs:annotation>
            <xs:documentation> Defines a period of time as a start/end date and time.
</xs:documentation>
        </xs:annotation>
        <xs:attribute name="StartTime" type="xs:dateTime" use="required"/>
        <xs:attribute name="EndTime" type="xs:dateTime" use="required"/>
    </xs:complexType>
</xs:schema>
<?xml version="1.0" encoding="UTF-8"?>
<xs:schema xmlns:base="Base/v1"
elementFormDefault="qualified"
targetNamespace=" CarrierControl/Plans/v1">
    <xs:import schemaLocation="Alias.xsd"
        namespace="CarrierControl/Base/v1"/>
    <!-- Plan Definition -->
    <xs:complexType name="BillingCycleType">
        <xs:attribute name="StartDate" use="required" type="xs:dateTime"/>
        <xs:attribute name="Duration" use="required">
            <xs:simpleType>
                <xs:restriction base="xs:duration">
                    <xs:minExclusive value="PT0S"/>
                </xs:restriction>
            </xs:simpleType>
        </xs:attribute>
        <xs:attribute name="Resets" type="xs:boolean" default="true"/>
    </xs:complexType>
    <xs:simpleType name="CostStyleType">
        <xs:annotation>
            <xs:documentation> CostType expresses the incremental cost of a plan: -
Unrestricted: There is no incremental cost for consumption on this plan - Fixed:
Consumption goes against a quota which the user has purchased / agreed to purchase -
Variable: The user will be billed for incremental usage on this plan
</xs:documentation>
        </xs:annotation>
        <xs:restriction base="xs:string">
            <xs:enumeration value="Unrestricted"/>
            <xs:enumeration value="Fixed"/>
            <xs:enumeration value="Variable"/>
        </xs:restriction>
```

```
      </xs:simpleType>
      <xs:element name="Plan">
         <xs:complexType>
            <xs:sequence>
               <xs:element minOccurs="0" ref="Description"/>
               <xs:element minOccurs="0" ref="Usage"/>
            </xs:sequence>
            <xs:attribute name="Name" use="required" type="xs:string"/>
         </xs:complexType>
      </xs:element>
      <xs:element name="Description" type="DescriptionBaseType" abstract="true"/>
      <xs:complexType name="DescriptionBaseType">
         <xs:sequence>
            <xs:element name="BillingCycle" type="BillingCycleType" minOccurs="0"/>
            <xs:element name="Conditions" minOccurs="0">
               <xs:complexType>
                  <xs:all>
                     <xs:element name="Location" type="base:LocationType" minOccurs="0"/>
                     <xs:element name="Time" type="base:TimeType" minOccurs="0"/>
                     <xs:element name="Direction" default="inout" minOccurs="0">
                        <xs:simpleType>
                           <xs:restriction base="xs:token">
                              <xs:enumeration value="in"/>
                              <xs:enumeration value="out"/>
                              <xs:enumeration value="inout"/>
                           </xs:restriction>
                        </xs:simpleType>
                     </xs:element>
                     <xs:element name="Destination" minOccurs="0">
                        <xs:complexType>
                           <xs:annotation>
                              <xs:documentation> PhoneNumber only applies to SMS/Voice plans; HostName only applies to data plans </xs:documentation>
                           </xs:annotation>
                           <xs:sequence>
                              <xs:element name="PhoneNumber" minOccurs="0">
                                 <xs:simpleType>
                                    <xs:restriction base="xs:string">
                                       <xs:pattern value="(\+)?\d+"/>
                                    </xs:restriction>
                                 </xs:simpleType>
                              </xs:element>
                              <xs:element name="HostName" minOccurs="0">
                                 <xs:simpleType>
                                    <xs:restriction base="xs:anyURI"/>
                                 </xs:simpleType>
                              </xs:element>
                           </xs:sequence>
                        </xs:complexType>
                     </xs:element>
                     <xs:element name="LimitedUsage" minOccurs="0">
                        <xs:annotation>
                           <xs:documentation> For Fixed plans, provides details on the user's quota: - Limit: The amount of the quota (in minutes for Voice plans, megabytes for Data plans, and messages for SMS plans) - SharedPlan: Another plan name whose quota is also consumed by usage on this plan - FallbackPlan: Another plan name whose consumption begins when this quota is exhausted. If a Fallback Plan is not provided, the current plan goes into an Overage state. </xs:documentation>
                        </xs:annotation>
                        <xs:complexType>
                           <xs:attribute name="Limit" use="required" type="xs:nonNegativeInteger"/>
                           <xs:attribute name="SharedPlan" type="xs:string"/>
                           <xs:attribute name="FallbackPlan" type="xs:string"/>
                        </xs:complexType>
                     </xs:element>
                  </xs:all>
               </xs:complexType>
            </xs:element>
         </xs:sequence>
         <xs:attribute name="CostStyle" use="required" type="CostStyleType"/>
      </xs:complexType>
      <xs:complexType name="DataPlanDescriptionType">
         <xs:complexContent>
```

```
            <xs:extension base="DescriptionBaseType">
                <xs:sequence>
                    <xs:element name="BandwidthInKbps"
type="xs:nonNegativeInteger" minOccurs="0"/>
                    <xs:element name="MaxDownloadFileSizeInMegabytes"
type="xs:positiveInteger" default="25" minOccurs="0"/>
                    <xs:element name="SecurityUpdatesExempt" type="xs:boolean"
default="false" minOccurs="0"/>
                </xs:sequence>
            </xs:extension>
        </xs:complexContent>
    </xs:complexType>
    <xs:element name="DataPlanDescription" type="DataPlanDescriptionType"
substitutionGroup="Description"/>
    <xs:complexType name="SmsPlanDescriptionType">
        <xs:complexContent>
            <xs:extension base="DescriptionBaseType"/>
        </xs:complexContent>
    </xs:complexType>
    <xs:element name="SmsPlanDescription" type="SmsPlanDescriptionType"
substitutionGroup="Description"/>
    <xs:complexType name="VoicePlanDescriptionType">
        <xs:complexContent>
            <xs:extension base="DescriptionBaseType"/>
        </xs:complexContent>
    </xs:complexType>
    <xs:element name="VoicePlanDescription" type="VoicePlanDescriptionType"
substitutionGroup="Description"/>
    <xs:element name="Usage" type="PlanUsageType"/>
    <xs:complexType name="PlanUsageType">
        <xs:attribute name="PlanName" use="required" type="xs:string"/>
        <xs:attribute name="OverLimit" type="xs:boolean"/>
        <xs:attribute name="Congested" type="xs:boolean"/>
        <xs:attribute name="CurrentUsage" use="required"
type="xs:nonNegativeInteger"/>
        <xs:attribute name="UsageTimestamp" use="required" type="xs:dateTime"/>
    </xs:complexType>
</xs:schema>
```

What is claimed is:

1. A system comprising:
a memory area associated with a mobile computing device, said memory area storing first data usage statistics, the first data usage statistics representing network data consumed by the mobile computing device under a data usage plan; and
a processor programmed to:
collect the first data usage statistics relating to the data usage plan and store the collected first data usage statistics in the memory area;
receive second data usage statistics relating to the data usage plan as collected by a mobile operator;
reconcile differences between the collected first data usage statistics and the received second data usage statistics, the reconciliation determining which of the collected first data usage statistics and the received second data usage statistics is a more up-to-date measure of the network data consumption under the data usage plan, wherein the reconciliation is performed based on the differences before generating a synchronization notification to update the first data usage statistics; and
update the first data usage statistics stored in the memory area based on the reconciliation, wherein the first data usage statistics are not updated when the collected first data usage statistics are more up-to-date than the received second data usage statistics.

2. The system of claim 1, wherein the processor is programmed to collect the first data usage statistics by receiving at least a portion of the first data usage statistics from other computing devices associated with the same data usage plan, wherein the collected first data usage statistics are updated when the received second data usage statistics are more up-to-date than the collected first data usage statistics.

3. The system of claim 2, wherein the processor is further programmed to send the updated first data usage statistics to the other computing devices based on the reconciliation.

4. The system of claim 2, wherein the processor is further programmed to send the synchronization notification to only the other computing devices that share the same data usage plan and have outdated first data usage statistics, based on the reconciliation, wherein the other computing devices that share the same data usage plan obtain the updated first data statistics by sending a synchronization request, after the reconciliation in response to the synchronization notification.

5. The system of claim 1, further comprising means for collecting and reconciling the first data usage statistics and the second data usage statistics.

6. The system of claim 1, further comprising means for synchronizing the first data usage statistics with the second data usage statistics.

7. A method comprising:
collecting, by a processor, first data usage statistics related to a data usage plan and store the collected first data usage statistics in a memory area;
receiving, by the processor, second data usage statistics related to the data usage plan as collected by a mobile operator;
reconciling, by the processor, differences between the collected first data usage statistics and the received second data usage statistics, the reconciliation determining which of the collected first data usage statistics and the received second data usage statistics is a more up-to-date measure of the network data consumption under the data usage plan, wherein the reconciliation is performed based on the differences before generating a synchronization notification to update the first data usage statistics; and updating the first data usage statistics stored in the memory area based on the reconciliation, wherein the first data usage statistics are not updated when the collected first data usage statistics are more up-to-date than the received second data usage statistics.

8. The method of claim 7, further comprising:

collecting the first data usage statistics related to the data usage plan from a plurality of user computing devices; and collecting, by a web service, the second data usage statistics related to the data usage plan from the mobile operator, the second data usage statistics representing network data collectively consumed by the plurality of user computing devices which share the same data usage plan.

9. The method of claim 7, further comprising sending the updated first data usage statistics to a plurality of user computing devices based on the reconciliation.

10. The method of claim 7, wherein reconciling the collected first data usage statistics and the received second data usage statistics comprises comparing a timestamp associated with the collected first data usage statistics and a timestamp associated with the received second data usage statistics, the comparison determining which of the collected first data usage statistics and the received second data usage statistics is more up-to-date.

11. The method of claim 9, further comprising sending the synchronization notification to the plurality of the user computing devices, sharing the same data usage plan, based on said reconciling.

12. The method of claim 7, wherein the data usage plan is described using a schema, the schema comprising an extensible markup language schema.

13. The method of claim 7, wherein the data usage plan describes threshold values associated with network connections of a plurality of the user computing devices.

14. The method of claim 13, wherein the threshold values correspond to maximum network data allotted under the data usage plan for the network connections.

15. The method of claim 13, wherein the threshold values correspond to one of a plurality of fields in a schema.

16. The method of claim 15, wherein the one of the plurality of fields comprises one or more of the following: peak times, off-peak times, peak time data consumption quota, off-peak time data consumption quota, peak time data consumption remaining, off-peak time data consumption remaining, a roaming rate, a mobile operator name, a billing cycle type, and a network connection type.

17. One or more computer storage media embodying computer-executable components, said components comprising:

a schema component that when executed causes at least one processor to:
receive, from at least one mobile operator, a schema populated with data describing a data usage plan associated with at least one user computing device,
distribute the received, populated schema to the at least one user computing device,
subsequently receive, from the mobile operator, an updated portion of the schema, the updated portion of the schema corresponding to an updated portion of the data usage plan, and
subsequently distribute only the received, updated portion of the schema to the at least one user computing device; and a statistics component that when executed causes at least one processor to:
receive first data usage statistics relating to the data usage plan as collected by the at least one user computing device,
receive second data usage statistics relating to the data usage plan as collected by the mobile operator,
reconcile differences between the received first data usage statistics and the received second data usage statistics, and
send, after said reconciling, a synchronization notification to the at least one user computing device based on said reconciled differences.

18. The computer storage media of claim 17, wherein the statistics component reconciles the received first data usage statistics and the received second data usage statistics by comparing a timestamp associated with the received first data usage statistics and a timestamp associated with the received second data usage statistics.

19. The computer storage media of claim 17, wherein the first data usage statistics represent network data consumed under the data usage plan by the at least one user computing device as determined by the at least one user computing device and the second data usage statistics received by the statistics component represent the network data consumed by the at least one user computing device under the data usage plan as measured by the mobile operator.

20. The computer storage media of claim 17, wherein the schema component and the statistics component execute without interacting with each other.

* * * * *